US009681427B2

(12) United States Patent
Zhang et al.

(10) Patent No.: US 9,681,427 B2
(45) Date of Patent: Jun. 13, 2017

(54) METHOD FOR TRANSMITTING FEEDBACK INFORMATION FOR DOWNLINK DATA, TERMINAL, AND BASE STATION

(71) Applicant: Huawei Technologies Co., Ltd., Shenzhen, Guangdong (CN)

(72) Inventors: Wen Zhang, Shenzhen (CN); Yongxia Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/578,019

(22) Filed: Dec. 19, 2014

(65) Prior Publication Data

US 2015/0139136 A1 May 21, 2015

Related U.S. Application Data

(63) Continuation of application No. PCT/CN2012/077726, filed on Jun. 28, 2012.

(51) Int. Cl.
| | | |
|---|---|---|
| *H04W 72/04* | (2009.01) | |
| *H04W 72/12* | (2009.01) | |
| *H04L 5/00* | (2006.01) | |
| *H04W 88/02* | (2009.01) | |
| *H04W 88/08* | (2009.01) | |

(52) U.S. Cl.
CPC ....... *H04W 72/0413* (2013.01); *H04L 5/0037* (2013.01); *H04L 5/0053* (2013.01); *H04W 72/042* (2013.01); *H04W 72/12* (2013.01); *H04W 88/02* (2013.01); *H04W 88/08* (2013.01)

(58) Field of Classification Search
CPC .......... H04W 72/0413; H04W 72/042; H04W 72/12; H04W 88/08; H04W 88/02
See application file for complete search history.

(56) References Cited

U.S. PATENT DOCUMENTS

| | | | |
|---|---|---|---|
| 2007/0133458 A1* | 6/2007 | Chandra | ............... H04L 1/0025 370/329 |
| 2008/0069031 A1* | 3/2008 | Zhang | .................. H04B 7/0617 370/328 |
| 2009/0279500 A1 | 11/2009 | Luo et al. | |
| 2010/0285810 A1 | 11/2010 | Ko et al. | |
| 2011/0235599 A1 | 9/2011 | Nam et al. | |

(Continued)

FOREIGN PATENT DOCUMENTS

| | | |
|---|---|---|
| CN | 101114868 A | 1/2008 |
| CN | 101621849 A | 1/2010 |

(Continued)

*Primary Examiner* — Ricky Ngo
*Assistant Examiner* — Lan Huong Truong

(57) ABSTRACT

This application provides a method for transmitting feedback information for downlink data, a terminal, and a base station. The method includes: receiving, by a terminal from a base station, DCI used for downlink data group scheduling and location information of a first feedback resource, where the DCI is used to indicate a scheduling condition of each terminal in a scheduling group to which the terminal belongs; receiving, by the terminal according to the DCI, downlink data sent by the base station; and sending, by the terminal according to the scheduling condition, feedback information for the downlink data by using the feedback resource indicated by the location information of the first feedback resource.

18 Claims, 2 Drawing Sheets

(56) References Cited

U.S. PATENT DOCUMENTS

| | | | |
|---|---|---|---|
| 2012/0009890 A1* | 1/2012 | Curcio | H04L 29/06 455/230 |
| 2012/0113942 A1* | 5/2012 | Kim | H04L 1/1861 370/329 |
| 2012/0188976 A1* | 7/2012 | Kim | H04L 1/0025 370/329 |
| 2012/0207103 A1* | 8/2012 | Dai | H04W 48/08 370/329 |
| 2012/0263087 A1* | 10/2012 | Aiba | H04B 1/7087 370/311 |
| 2013/0003788 A1* | 1/2013 | Marinier | H04B 7/024 375/219 |

FOREIGN PATENT DOCUMENTS

| | | |
|---|---|---|
| CN | 102158326 A | 8/2011 |
| CN | 102347823 A | 2/2012 |

\* cited by examiner

METHOD FOR TRANSMITTING FEEDBACK INFORMATION FOR DOWNLINK DATA, TERMINAL, AND BASE STATION

CROSS-REFERENCE TO RELATED APPLICATIONS

This application is a continuation of International Application No. PCT/CN2012/077726, filed on Jun. 28, 2012, which is hereby incorporated by reference in its entirety.

TECHNICAL FIELD

This application relates to communications technologies, and in particular, to a method for transmitting feedback information for downlink data, a terminal, and a base station.

BACKGROUND

In a wireless communications system such as a long term evolution (LTE) system, feedback information for downlink data (i.e., ACK information indicating that the downlink data is correctly received or NACK information indicating that the downlink data is not correctly received) that is sent by a user equipment (UE) to an evolved base station (e.g., Evolved NodeB, eNB) is borne by a physical uplink control channel (PUCCH). In a machine type communications (MTC) application with a large number of terminals, multiple terminals can be integrated into a scheduling group. A base station can schedule one or more terminals in a scheduling group through downlink control information (DCI) used for downlink data group scheduling, and the scheduled terminal can receive the downlink data according to the DCI and then send the feedback information for the downlink data to the base station through the PUCCH, where the DCI is borne by a physical downlink control channel (PDCCH). A PUCCH resource used by the scheduled terminal (i.e., a resource mapped by the PUCCH used by the terminal) is related to a PDCCH resource used by the base station (i.e., a control channel element (CCE) mapped by the PDCCH used by the base station), and is referred to as an implicit feedback resource.

However, in the prior art, the number of terminals scheduled by the base station is restricted by an aggregation level adopted by the PDCCH which is used by the base station to bear the DCI, and if the number of terminals scheduled by the base station exceeds the aggregation level adopted by the PDCCH, some terminals cannot send feedback information for downlink data to the base station due to lack of the PUCCH resource, which degrades feedback capabilities of the terminals.

SUMMARY

In multiple aspects of this application, a method for transmitting feedback information for downlink data, a terminal, and a base station are provided, to improve a feedback capability of a terminal.

In one aspect of this application, a method for transmitting feedback information for downlink data is provided and includes:

receiving, by a terminal from a base station, DCI used for downlink data group scheduling and location information of a first feedback resource, where the DCI is used to indicate a scheduling condition of each terminal in a scheduling group to which the terminal belongs;

receiving, by the terminal according to the DCI, downlink data sent by the base station; and sending, by the terminal according to the scheduling condition, feedback information for the downlink data by using the feedback resource indicated by the location information of the first feedback resource.

In another aspect of this application, a method for transmitting feedback information for downlink data is provided and includes:

sending, by a base station to a terminal, DCI used for downlink data group scheduling and location information of a first feedback resource, where the DCI is used to indicate a scheduling condition of each terminal in a scheduling group to which the terminal belongs;

sending, by the base station, downlink data to the terminal, so that the terminal receives the downlink data according to the DCI; and receiving, by the base station, feedback information for the downlink data sent by the terminal, where the feedback information for the downlink data is sent by the terminal to the base station according to the scheduling condition by using the feedback resource indicated by the location information of the first feedback resource.

In another aspect of this application, a terminal is provided and includes:

a receiver, configured to receive from a base station, DCI used for downlink data group scheduling and location information of a first feedback resource, where the DCI is used to indicate a scheduling condition of each terminal in a scheduling group to which the terminal belongs, and receive downlink data sent by the base station according to the DCI; and a sender, configured to send, according to the scheduling condition, feedback information for the downlink data by using the feedback resource indicated by the location information of the first feedback resource.

In another aspect of this application, a base station is provided and includes:

a sender, configured to send to a terminal, DCI used for downlink data group scheduling and location information of a first feedback resource, where the DCI is used to indicate a scheduling condition of each terminal in a scheduling group to which the terminal belongs, and send downlink data to the terminal, so that the terminal receives the downlink data according to the DCI; and a receiver, configured to receive feedback information for the downlink data sent by the terminal, where the feedback information for the downlink data is sent by the terminal to the base station according to the scheduling condition by using the feedback resource indicated by the location information of the first feedback resource.

It can be seen from the foregoing technical solutions that, in the embodiments of this application, the number of terminals scheduled by the base station is no longer restricted by the aggregation level adopted by the PDCCH which is used by the base station to bear the DCI, which solves a problem in the prior art that some terminals cannot send feedback information for downlink data to the base station due to lack of the PUCCH resource when the number of terminals scheduled by the base station exceeds the aggregation level adopted by the PDCCH, thereby improving feedback capabilities of the terminals.

BRIEF DESCRIPTION OF THE DRAWINGS

To describe the technical solutions in the embodiments of the present application or in the prior art more clearly, the following briefly introduces accompanying drawings required for describing the embodiments. Apparently, the accompanying drawings in the following description show merely some embodiments of the present application, and persons of ordinary skill in the art may still derive other drawings according to these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technical solutions provided in the embodiments of this application are applicable to various types of wireless communications systems, such as a global system for mobile communications (GSM), a general packet radio service (GPRS) system, a code division multiple access (CDMA) system, a CDMA2000 system, a wideband code division multiple access (WCDMA) system, a long term evolution (LTE) system or a world interoperability for microwave access (WiMAX) system.

A base station may be a base station (BTS) in the GSM system, the GPRS system or the CDMA system, may also be a base station (e.g., NodeB) in the CDMA2000 system or the WCDMA system, may also be an evolved base station (e.g., Evolved NodeB, eNB) in the LTE system, and may also be a network element such as an access service network base station (ASN BS) in a WiMAX network.

The term "and/or" in this application merely describes association between associated objects, and indicates that three relationships may exist. For example, A and/or B may indicate that the following three cases: A exists separately; both A and B exist; and B exists separately. In addition, the symbol "/" in this application generally indicates that the former and latter associated objects are in an "or" relationship.

Figure 1:
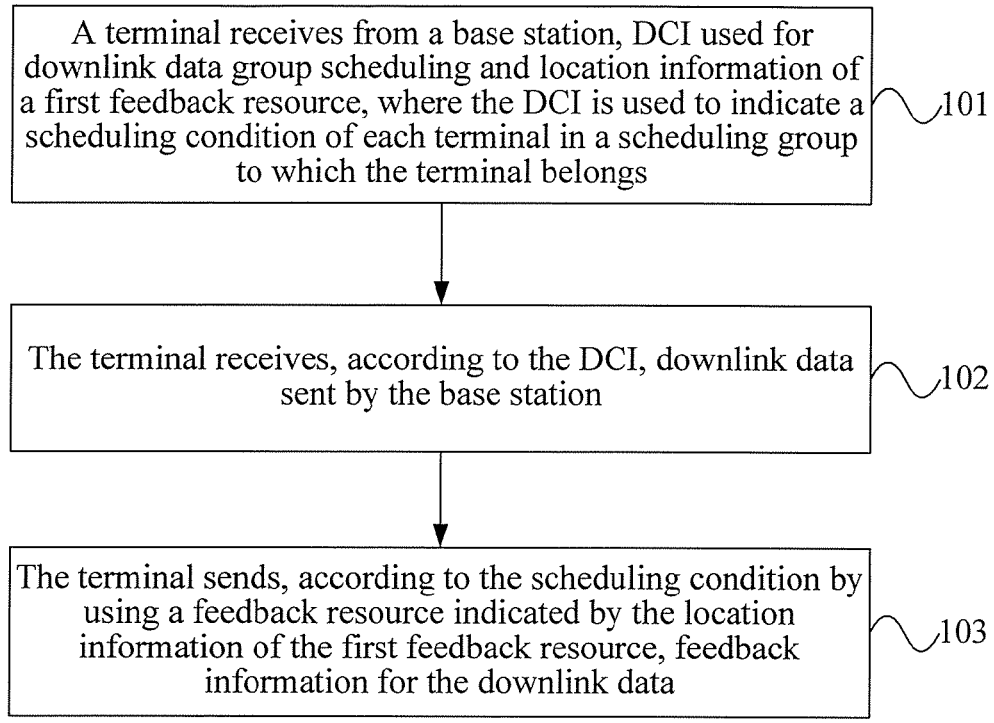
FIG. 1 is a schematic flowchart of a method for transmitting feedback information for downlink data according to an embodiment of this application.

FIG. 1 is a schematic flowchart of a method for transmitting feedback information for downlink data according to an embodiment of this application. Referring to FIG. 1:

101: A terminal receives from a base station, DCI used for downlink data group scheduling and location information of a first feedback resource, where the DCI is used to indicate a scheduling condition of each terminal in a scheduling group to which the terminal belongs.

102: The terminal receives, according to the DCI, downlink data sent by the base station.

103: The terminal sends, according to the scheduling condition by using the feedback resource indicated by the location information of the first feedback resource, feedback information for the downlink data (i.e., ACK information indicating that the downlink data is correctly received or NACK information indicating that the downlink data is not correctly received).

It is understandable that, in a frequency division duplex (FDD) mode, the terminal sends the feedback information for the downlink data after four subframes after receiving the DCI; and in a time division duplex (TDD) mode, the terminal sends the feedback information for the downlink data after another number of subframes after receiving the DCI.

Optionally, in an optional implementation manner of this embodiment, the location information of the first feedback resource (i.e., an available feedback resource) received by the terminal may be included in the DCI or in high-layer signaling.

For example, the high-layer signaling may be a radio resource control (RRC) message, and specifically, the location information of the first feedback resource may be carried through an information element (IE) in the RRC message. The RRC message may be an RRC message in the prior art, such as an RRC connection reconfiguration message, which is not limited in this embodiment, and an IE of the existing RRC message is extended to carry the location information of the first feedback resource; or the RRC message may also be different from the existing RRC message in the prior art.

In another example, the high-layer signaling may be a media access control (MAC) control element (CE) message, and specifically a new MAC CE message may be added to carry the location information of the first feedback resource.

Optionally, in an optional implementation manner of this embodiment, the first feedback resource (i.e., a PUCCH resource) is a subset of a second feedback resource (i.e., a PUCCH resource), and the second feedback resource may include, but is not limited to, at least one of the following feedback resources:

a reserved feedback resource preconfigured for the scheduling group to which the terminal belongs, where the reserved feedback resource is allowed to overlap a reserved feedback resource of another scheduling group; and a first implicit feedback resource, where the first implicit feedback resource is a feedback resource corresponding to a PDCCH resource used by the base station other than a PDCCH resource used for bearing the DCI.

Because the reserved feedback resources can overlap, i.e., the reserved feedback resources configured for scheduling groups are allowed to overlap, the reserved feedback resources can be effectively saved. The base station may determine, according to an occupation condition of the reserved feedback resources and a current group scheduling condition, which reserved feedback resource is idle, and deliver, to a currently scheduled terminal in the scheduling group, location information of the idle reserved feedback resource as location information of the available reserved feedback resource.

Due to use of the first implicit feedback resource, a utilization rate of the first implicit feedback resource can be effectively improved. The base station may determine, according to an occupation condition of the first implicit feedback resource and the current group scheduling condition, which first implicit feedback resource is idle, and deliver, to the currently scheduled terminal in the scheduling group, location information of the idle first implicit feedback resource as location information of the available first implicit feedback resource.

The location information of the first feedback resource may be an absolute start position of the first feedback resource. Such location information requires a large number of bits, and is only suitable as the location information included in the high-layer signaling but not suitable as the location information included in the DCI, so the overhead is relatively high. Or, the location information of the first feedback resource may be a relative start position of the first feedback resource (i.e., a start position in the second feedback resource). Such location information requires a small number of bits and is suitable as the location information included in the DCI and in the high-layer signaling, so the overhead is relatively low.

Optionally, in an optional implementation manner of this embodiment, if the second feedback resource is the reserved feedback resource, before 101, the terminal may further receive the location information of the reserved feedback resource sent by the base station. Correspondingly, the location information of the first feedback resource may be a start position in the second feedback resource.

The reserved feedback resources may be continuous PUCCH resources or alternate PUCCH resources, and this embodiment is not limited thereto.

Specifically, the reserved feedback resource preconfigured for each scheduling group is numbered, and a serial number of the reserved feedback resource and the location information of the reserved feedback resource can be informed to the terminal through the high-layer signaling.

For example, the high-layer signaling may be a radio resource control (RRC) message, and specifically, the serial number of the reserved feedback resource and the location information of the reserved feedback resource may be carried through an information element (IE) in the RRC message. The RRC message may be an RRC message in the prior art, such as an RRC connection reconfiguration message, which is not limited in this embodiment, and an IE of the existing RRC message is extended to carry the serial number of the reserved feedback resource and the location information of the reserved feedback resource; or the RRC message may also be different from the existing RRC message in the prior art.

In another example, the high-layer signaling may be a MAC CE message, and specifically a new MAC CE message may be added to carry the serial number of the reserved feedback resource and the location information of the reserved feedback resource.

It is understandable that, the high-layer signaling involved in the following embodiments may also be understood in the foregoing manner.

Optionally, in an optional implementation manner of this embodiment, in 103, the terminal may specifically determine, according to the scheduling condition and the location information of the first feedback resource, the feedback resource corresponding to the terminal; and send feedback information for the downlink data by using the determined second feedback resource.

Optionally, in an optional implementation manner of this embodiment, after 102, the terminal may further send feedback information for the downlink data according to the scheduling condition by using a second implicit feedback resource indicated by location information of a pre-obtained second implicit feedback resource, where the pre-obtained second implicit feedback resource is a feedback resource corresponding to the PDCCH resource used by the base station to bear the DCI. Specifically, the terminal may specifically determine, according to the scheduling condition and the location information of the pre-obtained second implicit feedback resource, the second implicit feedback resource corresponding to the terminal; and send the feedback information for the downlink data by using the determined second implicit feedback resource.

To make the method provided by the embodiment of this application clearer, the following uses an LTE system as an example.

Example 1

During each group scheduling, several user equipments (UE) (for example, the first several UEs according to an ascending order of serial numbers of UEs) adopt several implicit feedback resources (i.e., second implicit feedback resources, namely, PUCCH resources corresponding to a CCE mapped by a PDCCH bearing received DCI) for feedback, and a remaining UE adopts a reserved feedback resource for feedback, where a start position of an available reserved feedback resource is indicated in the DCI or a MAC CE message for group scheduling.

The number of the UEs adopting the second implicit feedback resources is not greater than an aggregation level L of the PDCCH (i.e., PDCCH for group scheduling) that bears the DCI used for downlink data group scheduling (i.e., DCI for group scheduling).

For example, assuming that the aggregation level L of the PDCCH (i.e., PDCCH for group scheduling) that bears the DCI used for downlink data group scheduling (i.e., DCI for group scheduling) satisfies L=4, it indicates that at most four second implicit feedback resources can be used; or the first second implicit feedback resource and the third second implicit feedback resource are used, and the second implicit feedback resource and the fourth second implicit feedback resource are not use; or the like.

In another example, assuming that the aggregation level L of the PDCCH for group scheduling satisfies L≥2, it can be specified that each group scheduling adopts only two second implicit feedback resources, and the remaining UE adopts the reserved feedback resource.

If the number of the UEs scheduled in one group scheduling is smaller than or equal to the number of the available second implicit feedback resources (i.e., the aggregation level L of the PDCCH for group scheduling), after the UE receives the DCI, the indication field can be ignored.

Specifically, the UEs in the group scheduling specifically adopt several second implicit feedback resources corresponding to the PDCCH resource for group scheduling, and it may be predetermined or informed through the high-layer signaling or indicated in the DCI or MAC CE message for group scheduling whether every other second implicit feedback resource is used or the second implicit feedback resources are sequentially used, for example, "0" indicates that two second implicit feedback resources are used, and "1" indicates that four second implicit feedback resources are used.

For example, assuming that UE#0, UE#3, UE#5, UE#6 and UE#7 are scheduled in one group scheduling, and the aggregation level L of the PDCCH for the group scheduling is 2, UE#0 and UE#3 may adopt the second implicit feedback resources for feedback, and the remaining UE#5, UE#6 and UE#7 need to adopt the reserved feedback resources for feedback.

Example 2

During each group scheduling, all the UEs adopt the reserved feedback resources for feedback, where the start position of the available reserved feedback resource is indicated in the DCI or MAC CE message for group scheduling.

For example, the DCI or MAC CE message for group scheduling may include a field which is used to indicate for the scheduled UE the start position of the PUCCH resource used by the UE. The start position may indicate each PUCCH resource, or indicate every other PUCCH resource. For example, assuming that there are eight PUCCH resources, if the DCI or MAC CE message for group scheduling indicates each PUCCH resource, 0, 1, 2, 3, 4, 5, 6 and 7 need to be indicated, and three bits (log 2(8)=3 bits) are required; and if the DCI or MAC CE message for group scheduling indicates every other PUCCH resource, for example, only 0, 2, 4, 6 need to be indicated, and only two bits (log 2 (4)=2 bits) are required. The indication rules may be predetermined, or informed through the high-layer signaling.

Figure 2:
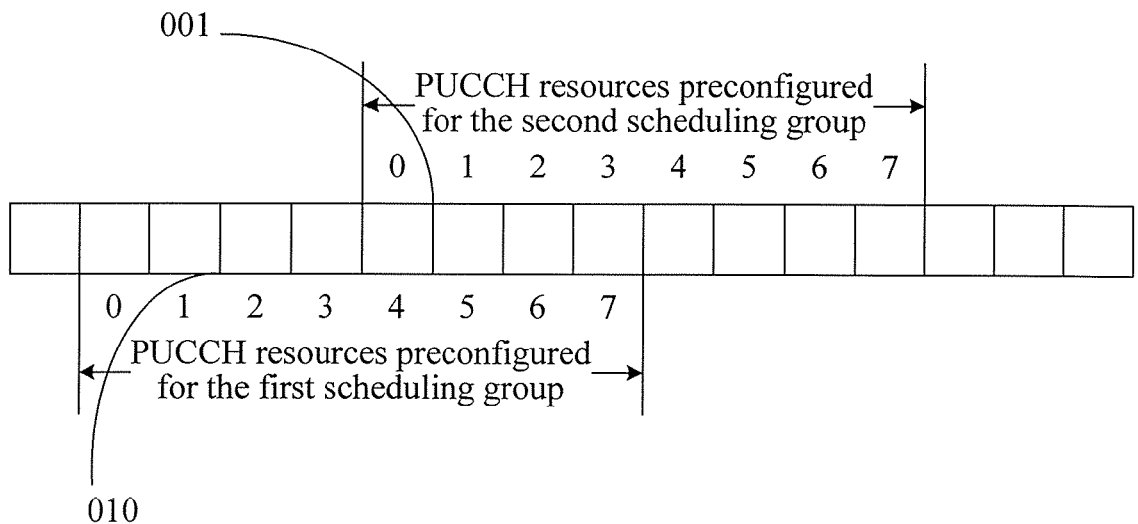
FIG. 2 is a schematic diagram of a reserved feedback resource in the embodiment corresponding to FIG. 1.

FIG. 2 is a schematic diagram of a reserved feedback resource in the embodiment corresponding to FIG. 1, where eight PUCCH resources are preconfigured for each scheduling group. A start position of a reserved feedback resource is represented by a 3 bit binary number. As shown in FIG. 2, in the group scheduling of the first scheduling group, DCI or a MAC CE message for group scheduling includes "010", i.e., the indicated PUCCH resources are several PUCCH resources after the PUCCH resource with the serial number being 2 (including the PUCCH resource with the serial number being 2); and in the group scheduling of the second scheduling group, the DCI or MAC CE message for group scheduling includes "001", i.e., the indicated PUCCH resources are several PUCCH resources after the PUCCH resource with the serial number being 1 (including the PUCCH resource with the serial number being 1). Herein, the indicated several PUCCH resources after the PUCCH resource may be continuous and may also be alternate, for example, respectively spaced by a PUCCH resource, i.e., if it is assumed that the start position is 2, the several PUCCHs allocated to the scheduled UE are respectively 2, 4, 6 . . . ; whether the PUCCH resources are continuous or alternate may be specifically predetermined or indicated through the high-layer signaling.

For example, it is assumed that eight PUCCH resources are preconfigured for a scheduling group, and the serial numbers of the PUCCH resources are respectively 0 to 7, which may be represented by 3 bit binary numbers 000 to 111. It is assumed that UE#0, UE#3, UE#5, UE#6 and UE#7 are scheduled in one group scheduling, and the aggregation level of the PDCCH for group scheduling is 2. If the PUCCH resource allocation method in the foregoing Example 1 is used, UE#0 and UE#3 may be indicated by using the second implicit feedback resources, and the remaining UE#5, UE#6 and UE#7 need to be indicated by using the reserved feedback resources. For example, if the DCI or MAC CE message for group scheduling indicates "010", it indicates that the three UEs respectively occupy three PUCCH resources after the PUCCH resource with the serial number being 2 (including this PUCCH resource), and if the PUCCH resources are continuously allocated, the serial numbers of the occupied reserved feedback resources are 2, 3 and 4. If the PUCCH resource allocation method in the foregoing Example 2 is used, UE#0, UE#3, UE#5, UE#6 and UE#7 may all be indicated by using the reserved feedback resources. For example, if the DCI or MAC CE message for group scheduling indicates "010", it indicates that the three UEs respectively occupy five PUCCH resources after the PUCCH resource with the serial number being 2 (including this PUCCH resource), and if the PUCCH resources are continuously allocated, the serial numbers of the occupied reserved feedback resources are 2, 3, 4, 5 and 6.

It should be noted that, the foregoing examples are specific to a group scheduling where the PDCCH schedules multiple UEs at the same time to receive downlink data in a subframe, and a similar method may be adopted for a group scheduling where the PDCCH schedules multiple UEs at the same time to receive downlink data in multiple subframes. For example, one of the following methods may be used for feedback.

Example 3

A scheduled UE in a scheduling group may adopt a second implicit feedback resource for feedback if the UE has downlink data in a subframe of a PDCCH under group scheduling, and the other scheduled UEs may occupy a reserved feedback resource in a time division manner, and the reserved feedback resource is indicated in the DCI or MAC CE message for group scheduling.

Example 4

All the UEs in a scheduling group may occupy a reserved feedback resource in a time division manner, and the reserved feedback resource is indicated in the DCI or MAC CE message for group scheduling.

In the LTE system, whether to use a PUCCH multi-antenna transmit diversity mechanism may be configured for a UE. In this embodiment, if a UE in a scheduling group is configured to use the PUCCH multi-antenna transmit diversity mechanism, the UE in the scheduling group needs to occupy two feedback resources when adopting the first feedback resource to send feedback information for downlink data, for example, if the DCI or MAC CE message for group scheduling indicates that the start position of the reserved feedback resource is the PUCCH resource with the serial number being 2, the PUCCH resources may be continuously allocated, i.e., the PUCCH resources with the serial numbers being 2 and 3 are allocated to one UE for use, the PUCCH resources with the serial numbers being 4 and 5 are allocated to another UE for use, and the rest can be deduced by analogy; or the PUCCH resources may be allocated in an interlaced manner, i.e., the PUCCH resources with the serial numbers being 2 and 4 are allocated to one UE for use, the PUCCH resources with the serial numbers being 3 and 5 are allocated to another UE for use, and the rest can be deduced by analogy; while if the UE in the scheduling group is not configured to use the PUCCH multi-antenna transmit diversity mechanism, the UE in the scheduling group only needs to occupy one feedback resource when adopting the first feedback resource to send feedback information for downlink data.

Optionally, in an optional implementation manner of this embodiment, if the second feedback resource is the first implicit feedback resource, the first implicit feedback resource is a feedback resource corresponding to a PDCCH resource used by the base station other than a PDCCH resource used for bearing the DCI.

In the LTE system, when the aggregation level L of the PDCCH that bears the DCI used for scheduling the downlink data satisfies L>1, a part of the implicit feedback resources (i.e., the first implicit feedback resource) may be unoccupied. For example, if the aggregation level L of the PDCCH that bears the DCI used for scheduling a UE is 8, seven PUCCH resources are unoccupied. In this embodiment, the unoccupied implicit feedback resources may be allocated to UEs under group scheduling for use.

Example 6

During each group scheduling, several user equipments (User Equipment, UE) (for example, the first several UEs according to an ascending order of serial numbers of UEs) adopt several implicit feedback resources (i.e., second implicit feedback resources, namely, PUCCH resources corresponding to a CCE mapped by a PDCCH bearing received DCI) for feedback, and the remaining UE adopts a first implicit feedback resource (i.e., a PUCCH resource corresponding to a CCE mapped by a PDCCH other than the PDCCH resource bearing the DCI) for feedback, where a start position of an available first implicit feedback resource is indicated in the DCI or a MAC CE message for group scheduling.

The number of the UEs adopting the second implicit feedback resources is not greater than the aggregation level L of the PDCCH (i.e., PDCCH for group scheduling) that bears the DCI used for downlink data group scheduling (i.e., DCI for group scheduling).

For example, assuming that the aggregation level L of the PDCCH (i.e., PDCCH for group scheduling) that bears the DCI used for downlink data group scheduling (i.e., DCI for group scheduling) satisfies L=4, it indicates that at most four second implicit feedback resources can be used, or the first second implicit feedback resource and the third second implicit feedback resource are used, or the like.

In another example, assuming that the aggregation level L of the PDCCH for group scheduling satisfies L≥2, it can be specified that each group scheduling adopts only two second implicit feedback resources, and the remaining UE adopts the first implicit feedback resource.

If the number of the UEs scheduled in one group scheduling is smaller than or equal to the number of the available second implicit feedback resources (i.e., the aggregation level L of the PDCCH for group scheduling), after the UE receives the DCI, the indication field can be ignored.

Specifically, the UEs in the group scheduling specifically adopt several second implicit feedback resources corresponding to the PDCCH resource for group scheduling, and it may be predetermined or informed through the high-layer signaling or indicated in the DCI or MAC CE message for group scheduling whether every other second implicit feedback resource is used or the second implicit feedback resources are sequentially used, for example, "0" indicates that two second implicit feedback resources are used, and "1" indicates that four second implicit feedback resources are used.

For example, assuming that UE#0, UE#3, UE#5, UE#6 and UE#7 are scheduled in one group scheduling, and the aggregation level L of the PDCCH for group scheduling is 2, UE#0 and UE#3 may adopt the second implicit feedback resources for feedback, and the remaining UE#5, UE#6 and UE#7 need to adopt the first implicit feedback resources for feedback.

Example 7

During each group scheduling, all the UEs adopt first implicit feedback resources (i.e., PUCCH resources corresponding to a CCE mapped by a PDCCH other than a PDCCH resource bearing DCI) for feedback, where a start position of an available first implicit feedback resource is indicated in the DCI or a MAC CE message for group scheduling.

For example, the DCI or MAC CE message for group scheduling may include a field which is used to indicate for the scheduled UE the start position of the PUCCH resource used by the UE. The start position may indicate each PUCCH resource, or indicate every other PUCCH resource. For example, assuming that there are eight PUCCH resources, if the DCI or MAC CE message for group scheduling indicates each PUCCH resource, 0, 1, 2, 3, 4, 5, 6 and 7 need to be indicated, and three bits (log 2(8)=3 bits) are required; and if the DCI or MAC CE message for group scheduling indicates every other PUCCH resource, for example, only 0, 2, 4, 6 need to be indicated, only two bits (log 2 (4)=2 bits) are required. The indication rules may be predetermined, or informed through the high-layer signaling.

The method for indicating the start position of the available first implicit feedback resource in the DCI or MAC CE message for group scheduling may be as follows:

A: Indicate a value x, and allocate several PUCCH resources (in a continuous or alternate manner) before or after the PUCCH resource corresponding to the value x to a group of UEs, where a granularity of indication may be per each PUCCH resource or every several PUCCH resources. For example, a value x is indicated through high-layer signaling, and the corresponding PUCCH resources are: $n_{PUCCH}^{(1)} = x + N_{PUCCH}^{(1)}$, where $N_{PUCCH}^{(1)}$ is a high-layer configured parameter.

B: Indicate an offset value relative to the implicit feedback resource for group scheduling, and allocate several PUCCH resources (in a continuous or alternate manner) before or after the offset value to a group of UEs, where a granularity of indication may be per each PUCCH resource or every several PUCCH resources.

In the LTE system, whether to use a PUCCH multi-antenna transmit diversity mechanism may be configured for a UE. In this embodiment, if a UE in a scheduling group is configured to use the PUCCH multi-antenna transmit diversity mechanism, the UE in the scheduling group needs to occupy two feedback resources when adopting the first feedback resource to send feedback information for downlink data. For example, if the DCI or MAC CE message for group scheduling indicates that the start position of the first implicit feedback resource is the PUCCH resource with the serial number being 2, the PUCCH resources may be continuously allocated, i.e., the PUCCH resources with the serial numbers being 2 and 3 are allocated to one UE for use, the PUCCH resources with the serial numbers being 4 and 5 are allocated to another UE for use, and the rest can be deduced by analogy; or the PUCCH resources may be allocated in an interlaced manner, i.e., the PUCCH resources with the serial numbers being 2 and 4 are allocated to one UE for use, the PUCCH resources with the serial numbers being 3 and 5 are allocated to another UE for use, and the rest can be deduced by analogy; while if the UE in the scheduling group is not configured to use the PUCCH multi-antenna transmit diversity mechanism, the UE in the scheduling group only needs to occupy one feedback resource when adopting the first feedback resource to send feedback information for downlink data.

Optionally, in an optional implementation manner of this embodiment, if the second feedback resource includes the reserved feedback resource and the first implicit feedback resource, the first implicit feedback resource is a feedback resource corresponding to a PDCCH resource used by the base station other than a PDCCH resource used for bearing the DCI.

Example 8

During each group scheduling, several user equipments (User Equipment, UE) (for example, the first several UEs according to an ascending order of serial numbers of UEs) adopt several implicit feedback resources (i.e., second implicit feedback resources, namely, PUCCH resources corresponding to a CCE mapped by a PDCCH bearing received DCI) for feedback, and the remaining UE adopts a reserved feedback resource and/or a first implicit feedback resource (i.e., a PUCCH resource corresponding to a CCE mapped by a PDCCH other than a PDCCH resource bearing the DCI) for feedback, where start positions of the available reserved feedback resource and the available first implicit feedback resource are indicated in the DCI or a MAC CE message for group scheduling.

The method for indicating the start positions of the available reserved feedback resource and the available first implicit feedback resource in the DCI or MAC CE message for group scheduling may be as follows:

A. Adopt 4 bits for indication.

One bit may be adopted to indicate which feedback resource is used, for example, "0" is used to indicate that the reserved feedback resource is used, and "1" is used to indicate that the first implicit feedback resource is used; or, "1" is used to indicate that the reserved feedback resource is used, and "0" is used to indicate that the first implicit feedback resource is used; and the remaining 3 bits are used to indicate the start position of the second feedback resource.

B. Adopt 2 bits for indication.

"00" is used to indicate that the reserved feedback resource is used and the occupation starts from a certain reserved feedback resource by default, for example, the occupation starts from a PUCCH resource with the serial number being 0;

"01" is used to indicate that the first implicit feedback resource is used and forward search for the PUCCH resource is performed, for example, the PUCCH resource before the PUCCH resource corresponding to the PDCCH resource for group scheduling may be unoccupied, and forward search for the unoccupied PUCCH resource is directly performed;

"10" is used to indicate the start position of the adopted reserved feedback resource, where n reserved feedback resources (a value of n is predetermined or informed through the high-layer signaling) are used first, the occupation starts from a certain reserved feedback resource by default, and then forward search for the PUCCH resource is performed; and "11" is used to indicate the start position of the adopted first implicit feedback resource, where forward search for m PUCCH resources (a value of m is predetermined or informed through the high-layer signaling) are first performed, and then the reserved feedback resource is searched, where the occupation starts from a certain reserved feedback resource by default.

Example 9

During each group scheduling, all the UEs adopt a reserved feedback resource and/or a first implicit feedback resource (i.e., a PUCCH resource corresponding to a CCE mapped by a PDCCH other than a PDCCH resource bearing DCI) for feedback, where start positions of the available reserved feedback resource and the available first implicit feedback resource are indicated in the DCI or a MAC CE message for group scheduling.

The method for indicating the start positions of the available reserved feedback resource and the available first implicit feedback resource in the DCI or MAC CE message for group scheduling may be as follows:

A. Adopt 4 bits for indication.

One bit may be adopted to indicate which feedback resource is used, for example, "0" is used to indicate that the reserved feedback resource is used, and "1" is used to indicate that the first implicit feedback resource is used; or, "1" is used to indicate that the reserved feedback resource is used, and "0" is used to indicate that the first implicit feedback resource is used; and the remaining 3 bits are used to indicate the start position of the second feedback resource.

B. Adopt 2 bits for indication.

"00" is used to indicate that the reserved feedback resource is used and the occupation starts from a certain reserved feedback resource by default, for example, the occupation starts from a PUCCH resource with the serial number being 0;

"01" is used to indicate that the first implicit feedback resource is used and forward search for the PUCCH resource is performed, for example, the PUCCH resource before the PUCCH resource corresponding to the PDCCH resource for group scheduling may be unoccupied, and forward search for the unoccupied PUCCH resource is directly performed;

"10" is used to indicate the start position of the adopted reserved feedback resource, where n reserved feedback resources (a value of n is predetermined or informed through the high-layer signaling) are used first, the occupation starts from a certain reserved feedback resource by default, and then forward search for the PUCCH resource is performed; and "11" is used to indicate the start position of the adopted first implicit feedback resource, where forward search for m PUCCH resources (a value of m is predetermined or informed through the high-layer signaling) are first performed, and then the reserved feedback resource is searched, where the occupation starts from a certain reserved feedback resource by default.

In this embodiment, a terminal receives from a base station, DCI used for downlink data group scheduling and location information of a first feedback resource, where the DCI is used to indicate a scheduling condition of each terminal in a scheduling group to which the terminal belongs, and receives, according to the DCI, downlink data sent by the base station, so that the terminal is capable of sending, according to the scheduling condition by using the feedback resource indicated by the location information of the first feedback resource, feedback information for the downlink data. The number of terminals scheduled by the base station is no longer restricted by an aggregation level adopted by a PDCCH which is used by the base station to bear the DCI, which solves a problem in the prior art that some terminals cannot send feedback information for downlink data to the base station due to lack of the PUCCH resource when the number of terminals scheduled by the base station exceeds the aggregation level adopted by the PDCCH, thereby improving feedback capabilities of the terminals.

Figure 3:
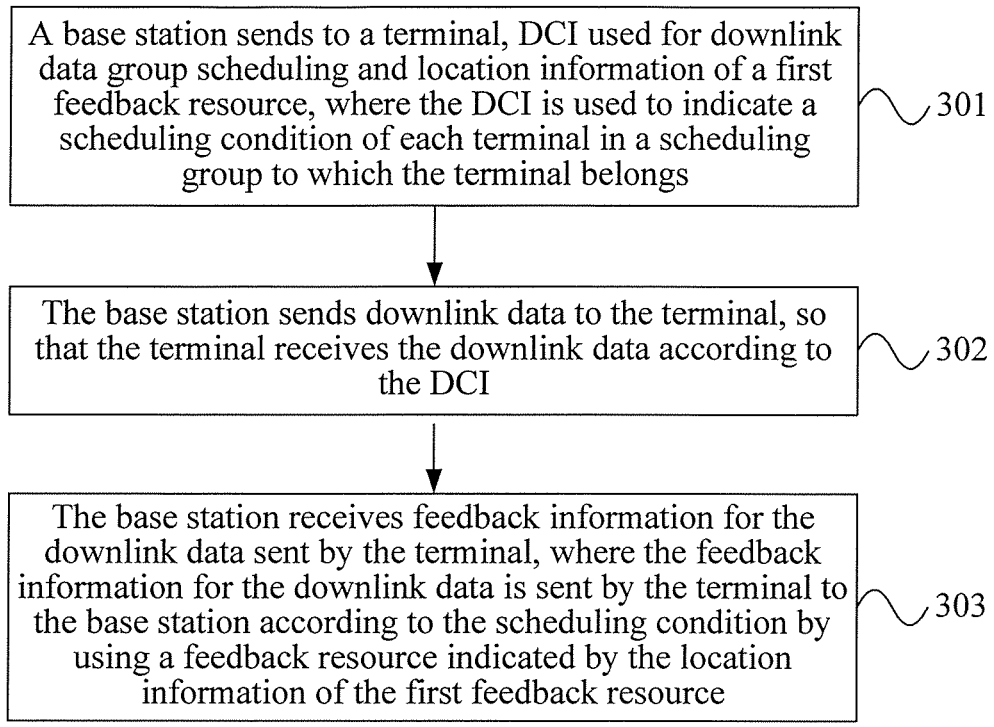
FIG. 3 is a schematic flowchart of a method for transmitting feedback information for downlink data according to another embodiment of this application.

FIG. 3 is a schematic flowchart of a method for transmitting feedback information for downlink data according to another embodiment of this application. Referring to FIG. 3:

301: A base station sends to a terminal, DCI used for downlink data group scheduling and location information of a first feedback resource, where the DCI is used to indicate a scheduling condition of each terminal in a scheduling group to which the terminal belongs.

302: The base station sends downlink data to the terminal, so that the terminal receives the downlink data according to the DCI.

303: The base station receives feedback information for the downlink data (i.e., ACK information indicating that the downlink data is correctly received or NACK information indicating that the downlink data is not correctly received) sent by the terminal, where the feedback information for the downlink data is sent by the terminal to the base station according to the scheduling condition by using the feedback resource indicated by the location information of the first feedback resource.

It is understandable that, in a frequency division duplex (FDD) mode, the terminal sends the feedback information for the downlink data after four subframes after receiving the DCI; and in a time division duplex (Time Division Duplex, TDD) mode, the terminal sends the feedback information for the downlink data after another number of subframes after receiving the DCI.

Optionally, in an optional implementation manner of this embodiment, the location information of the first feedback resource (i.e., an available feedback resource) sent by the base station to the terminal may be included in the DCI or in high-layer signaling.

For example, the high-layer signaling may be a radio resource control (RRC) message, and specifically, the location information of the first feedback resource may be carried through an information element (IE) in the RRC message. The RRC message may be an RRC message in the prior art, such as an RRC connection reconfiguration message, which is not limited in this embodiment; and an IE of the existing RRC message is extended to carry the location information of the first feedback resource. Or, the RRC message may also be different from the existing RRC message in the prior art.

In another example, the high-layer signaling may be a media access control (MAC) control element (CE) message, and specifically a new MAC CE message may be added to carry the location information of the first feedback resource.

Optionally, in an optional implementation manner of this embodiment, the first feedback resource (i.e., a PUCCH resource) is a subset of a second feedback resource (i.e., a PUCCH resource), and the second feedback resource may include, but is not limited to, at least one of the following feedback resources:

a reserved feedback resource preconfigured for the scheduling group to which the terminal belongs, where the reserved feedback resource is allowed to overlap a reserved feedback resource of another scheduling group; and a first implicit feedback resource, where the first implicit feedback resource is a feedback resource corresponding to a PDCCH resource used by the base station other than a PDCCH resource used for bearing the DCI.

Because the reserved feedback resources can overlap, i.e., the reserved feedback resources configured for scheduling groups are allowed to overlap, the reserved feedback resources can be effectively saved. The base station may determine, according to an occupation condition of the reserved feedback resources and a current group scheduling condition, which reserved feedback resource is idle, and deliver, to a currently scheduled terminal in the scheduling group, location information of the idle reserved feedback resource as location information of the available reserved feedback resource.

Due to use of the first implicit feedback resource, a utilization rate of the first implicit feedback resource can be effectively improved. The base station may determine, according to an occupation condition of the first implicit feedback resource and the current group scheduling condition, which first implicit feedback resource is idle, and deliver, to the currently scheduled terminal in the scheduling group, location information of the idle first implicit feedback resource as location information of the available first implicit feedback resource.

The location information of the first feedback resource may be an absolute start position of the first feedback resource. Such location information requires a large number of bits, and is only suitable as the location information included in the high-layer signaling but not suitable as the location information included in the DCI, so the overhead is relatively high. Or, the location information of the first feedback resource may be a relative start position of the first feedback resource (i.e., a start position in the second feedback resource). Such location information requires a small number of bits and is suitable as the location information included in the DCI and in the high-layer signaling, so the overhead is relatively low.

Optionally, in an optional implementation manner of this embodiment, if the second feedback resource is the reserved feedback resource, before 301, the base station may further send the location information of the reserved feedback resource to the terminal. Correspondingly, the location information of the first feedback resource may be a start position in the second feedback resource.

The reserved feedback resources may be continuous PUCCH resources or alternate PUCCH resources, and this embodiment is not limited thereto.

Specifically, the reserved feedback resource preconfigured for each scheduling group is numbered, and the base station may inform the terminal of the serial number of the reserved feedback resource and the location information of the reserved feedback resource through the high-layer signaling.

For example, the high-layer signaling may be a radio resource control (RRC) message, and specifically, the serial number of the reserved feedback resource and the location information of the reserved feedback resource may be carried through an information element (IE) in the RRC message. The RRC message may be an RRC message in the prior art, such as an RRC connection reconfiguration message, which is not limited in this embodiment; and an IE of the existing RRC message is extended to carry the serial number of the reserved feedback resource and the location information of the reserved feedback resource. Or, the RRC message may also be different from the existing RRC message in the prior art.

In another example, the high-layer signaling may be a MAC CE message, and specifically a new MAC CE message may be added to carry the serial number of the reserved feedback resource and the location information of the reserved feedback resource.

It is understandable that, the high-layer signaling involved in the following embodiments may also be understood in the foregoing manner.

Optionally, in an optional implementation manner of this embodiment, the terminal may specifically determine, according to the scheduling condition and the location information of the first feedback resource, the feedback resource corresponding to the terminal; and send feedback information for the downlink data by using the determined second feedback resource.

Optionally, in an optional implementation manner of this embodiment, after 302, the base station may further receive the feedback information for the downlink data sent by the terminal, where the feedback information for the downlink data is sent by the terminal to the base station according to the scheduling condition by using a second implicit feedback resource indicated by location information of a pre-obtained second implicit feedback resource, and the pre-obtained second implicit feedback resource is a feedback resource corresponding to the PDCCH resource used by the base station to bear the DCI. Specifically, the terminal may specifically determine, according to the scheduling condition and the location information of the pre-obtained second implicit feedback resource, the second implicit feedback resource corresponding to the terminal; and send the feedback information for the downlink data by using the determined second implicit feedback resource.

To make the method provided by the embodiment of this application clearer, the following uses an LTE system as an example.

Example 1

During each group scheduling, several user equipments (UE) (for example, the first several UEs according to an ascending order of serial numbers of UEs) adopt several implicit feedback resources (i.e., second implicit feedback resources, namely, PUCCH resources corresponding to a CCE mapped by a PDCCH bearing received DCI) for feedback, and a remaining UE adopts a reserved feedback resource for feedback, where a start position of an available reserved feedback resource is indicated in the DCI or a MAC CE message for group scheduling.

The number of the UEs adopting the second implicit feedback resources is not greater than an aggregation level L of the PDCCH (i.e., PDCCH for group scheduling) that bears the DCI used for downlink data group scheduling (i.e., DCI for group scheduling).

For example, assuming that the aggregation level L of the PDCCH (i.e., PDCCH for group scheduling) that bears the DCI used for downlink data group scheduling (i.e., DCI for group scheduling) satisfies L=4, it indicates that at most four second implicit feedback resources can be used, or the first second implicit feedback resource and the third second implicit feedback resource are used, or the like.

In another example, assuming that the aggregation level L of the PDCCH for group scheduling satisfies 1.2, it can be specified that each group scheduling adopts only two second implicit feedback resources, and the remaining UE adopt the reserved feedback resource.

If the number of the UEs scheduled in one group scheduling is smaller than or equal to the number of the available second implicit feedback resources (i.e., the aggregation level L of the PDCCH for group scheduling), after the UE receives the DCI, the indication field can be ignored.

Specifically, the UEs in the group scheduling specifically adopt several second implicit feedback resources corresponding to the PDCCH resource for group scheduling, and it may be predetermined or informed through the high-layer signaling or indicated in the DCI or MAC CE message for group scheduling whether every other second implicit feedback resource is used or the second implicit feedback resources are sequentially used, for example, "0" indicates that two second implicit feedback resources are used, and "1" indicates that four second implicit feedback resources are used.

For example, assuming that UE#0, UE#3, UE#5, UE#6 and UE#7 are scheduled in one group scheduling, and the aggregation level L of the PDCCH for the group scheduling is 2, UE#0 and UE#3 may adopt the second implicit feedback resources for feedback, and the remaining UE#5, UE#6 and UE#7 need to adopt the reserved feedback resources for feedback.

Example 2

During each group scheduling, all the UEs adopt the reserved feedback resources for feedback, where the start position of the available reserved feedback resource is indicated in the DCI or MAC CE message for group scheduling.

For example, the DCI or MAC CE message for group scheduling may include a field which is used to indicate for the scheduled UE the start position of the PUCCH resource used by the UE. The start position may indicate each PUCCH resource, or indicate every other PUCCH resource. For example, assuming that there are eight PUCCH resources, if the DCI or MAC CE message for group scheduling indicates each PUCCH resource, 0, 1, 2, 3, 4, 5, 6 and 7 need to be indicated, and three bits (log 2 (8)=3 bits) are required; and if the DCI or MAC CE message for group scheduling indicates every other PUCCH resource, for example, only 0, 2, 4, 6 need to be indicated, and only 2 bits (log 2 (4)=2 bits) are required. The indication rules may be predetermined, or informed through the high-layer signaling.

FIG. 2 is a schematic diagram of a reserved feedback resource in the embodiment corresponding to FIG. 1, where eight PUCCH resources are preconfigured for each scheduling group. A start position of a reserved feedback resource is represented by a 3 bit binary number. As shown in FIG. 2, in the group scheduling of the first scheduling group, DCI or a MAC CE message for group scheduling includes "010", i.e., the indicated PUCCH resources are several PUCCH resources after the PUCCH resource with the serial number being 2 (including the PUCCH resource with the serial number being 2); and in the group scheduling of the second scheduling group, the DCI or MAC CE message for group scheduling includes "001", i.e., the indicated PUCCH resources are several PUCCH resources after the PUCCH resource with the serial number being 1 (including the PUCCH resource with the serial number being 1). Herein, the indicated several PUCCH resources after the PUCCH resource may be continuous and may also be alternate, for example, respectively spaced by a PUCCH resource, i.e., if it is assumed that the start position is 2, the several PUCCHs allocated to the scheduled UE are respectively 2, 4, 6 . . . ; whether the PUCCH resources are continuous or alternate may be specifically predetermined or indicated through the high-layer signaling.

For example, it is assumed that eight PUCCH resources are preconfigured for a scheduling group, and the serial numbers of the PUCCH resources are respectively 0 to 7, which may be represented by 3 bit binary numbers 000 to 111. It is assumed that UE#0, UE#3, UE#5, UE#6 and UE#7 are scheduled in one group scheduling, and the aggregation level of the PDCCH for group scheduling is 2. If the PUCCH resource allocation method in the foregoing Example 1 is used, UE#0 and UE#3 may be indicated by using the second implicit feedback resources, and the remaining UE#5, UE#6 and UE#7 need to be indicated by using the reserved feedback resources. For example, if the DCI or MAC CE message for group scheduling indicates "010", it indicates that the three UEs respectively occupy three PUCCH resources after the PUCCH resource with the serial number being 2 (including this PUCCH resource), and if the PUCCH resources are continuously allocated, the serial numbers of the occupied reserved feedback resources are 2, 3 and 4. If the PUCCH resource allocation method in the foregoing Example 2 is used, UE#0, UE#3, UE#5, UE#6 and UE#7 may all be indicated by using the reserved feedback resources. For example, if the DCI or MAC CE message for group scheduling indicates "010", it indicates that the three UEs respectively occupy five PUCCH resources after the PUCCH resource with the serial number being 2 (including this PUCCH resource), and if the PUCCH resources are continuously allocated, the serial numbers of the occupied reserved feedback resources are 2, 3, 4, 5 and 6.

It should be noted that, the foregoing examples are specific to a group scheduling where the PDCCH schedules multiple UEs at the same time to receive downlink data in a subframe, and a similar method may be adopted for a group scheduling where the PDCCH schedules multiple UEs at the same time to receive downlink data in multiple subframes. For example, one of the following methods may be used for feedback.

Example 3

A scheduled UE in a scheduling group may adopt a second implicit feedback resource for feedback if the UE has downlink data in a subframe of a PDCCH under group scheduling, and the other scheduled UEs may occupy a reserved feedback resource in a time division manner, and the reserved feedback resource is indicated in the DCI or MAC CE message for group scheduling.

Example 4

All the UEs in a scheduling group may occupy a reserved feedback resource in a time division manner, and the reserved feedback resource is indicated in the DCI or MAC CE message for group scheduling.

In the LTE system, whether to use a PUCCH multi-antenna transmit diversity mechanism may be configured for a UE. In this embodiment, if a UE in a scheduling group is configured to use the PUCCH multi-antenna transmit diversity mechanism, the UE in the scheduling group needs to occupy two feedback resources when adopting the first feedback resource to send feedback information for downlink data, for example, if the DCI or MAC CE message for group scheduling indicates that the start position of the reserved feedback resource is the PUCCH resource with the serial number being 2, the PUCCH resources may be continuously allocated, i.e., the PUCCH resources with the serial numbers being 2 and 3 are allocated to one UE for use, the PUCCH resources with the serial numbers being 4 and 5 are allocated to another LTE for use, and the rest can be deduced by analogy; or the PUCCH resources may be allocated in an interlaced manner, i.e., the PUCCH resources with the serial numbers being 2 and 4 are allocated to one LIE for use, the PUCCH resources with the serial numbers being 3 and 5 are allocated to another UE for use, and the rest can be deduced by analogy; while if the LIE in the scheduling group is not configured to use the PUCCH multi-antenna transmit diversity mechanism, the UE in the scheduling group only needs to occupy one feedback resource when adopting the first feedback resource to send feedback information for downlink data.

Optionally, in an optional implementation manner of this embodiment, if the second feedback resource is the first implicit feedback resource, the first implicit feedback resource is a feedback resource corresponding to a PDCCH resource used by the base station other than a PDCCH resource used for bearing the DCI.

In the LTE system, when the aggregation level L of the PDCCH that bears the DCI used for scheduling the downlink data satisfies L>1, a part of the implicit feedback resources (i.e., the first implicit feedback resource) may be unoccupied. For example, if the aggregation level L of the PDCCH that bears the DCI used for scheduling a UE is 8, seven PUCCH resources are unoccupied. In this embodiment, the unoccupied implicit feedback resources may be allocated to UEs under group scheduling for use.

Example 6

During each group scheduling, several user equipments (User Equipment, UE) (for example, the first several UEs according to an ascending order of serial numbers of UEs) adopt several implicit feedback resources (i.e., second implicit feedback resources, namely, PUCCH resources corresponding to a CCE mapped by a PDCCH bearing received DCI) for feedback, and the remaining UE adopts a first implicit feedback resource (i.e., a PUCCH resource corresponding to a CCE mapped by a PDCCH other than the PDCCH resource bearing the DCI) for feedback, where a start position of an available first implicit feedback resource is indicated in the DCI or a MAC CE message for group scheduling.

The number of the UEs adopting the second implicit feedback resources is not greater than the aggregation level L of the PDCCH (i.e., PDCCH for group scheduling) that bears the DCI used for downlink data group scheduling (i.e., DCI for group scheduling).

For example, assuming that the aggregation level L of the PDCCH (i.e., PDCCH for group scheduling) that bears the DCI used for downlink data group scheduling (i.e., DCI for group scheduling) satisfies L=4, it indicates that at most four second implicit feedback resources can be used, or the first second implicit feedback resource and the third second implicit feedback resource are used, or the like.

In another example, assuming that the aggregation level L of the PDCCH for group scheduling satisfies L≥2, it can be specified that each group scheduling adopts only two second implicit feedback resources, and the remaining UE adopts the first implicit feedback resource.

If the number of the UEs scheduled in one group scheduling is smaller than or equal to the number of the available second implicit feedback resources (i.e., the aggregation level L of the PDCCH for group scheduling), after the UE receives the DCI, the indication field can be ignored.

Specifically, the UEs in the group scheduling specifically adopt several second implicit feedback resources corresponding to the PDCCH resource for group scheduling, and it may be predetermined or informed through the high-layer signaling or indicated in the DCI or MAC CE message for group scheduling whether every other second implicit feedback resource is used or the second implicit feedback resources are sequentially used, for example, "0" indicates that two second implicit feedback resources are used, and "1" indicates that four second implicit feedback resources are used.

For example, assuming that UE#0, UE#3, UE#5, UE#6 and UE#7 are scheduled in one group scheduling, and the aggregation level L of the PDCCH for group scheduling is 2, UE#0 and UE#3 may adopt the second implicit feedback resources for feedback, and the remaining UE#5, UE#6 and UE#7 need to adopt the first implicit feedback resources for feedback.

Example 7

During each group scheduling, all the UEs adopt first implicit feedback resources (i.e., PUCCH resources corresponding to a CCE mapped by a PDCCH other than a PDCCH resource bearing DCI) for feedback, where a start position of an available first implicit feedback resource is indicated in the DCI or a MAC CE message for group scheduling.

For example, the DCI or MAC CE message for group scheduling may include a field which is used to indicate for the scheduled UE the start position of the PUCCH resource used by the UE. The start position may indicate each PUCCH resource, or indicate every other PUCCH resource. For example, assuming that there are eight PUCCH resources, if the DCI or MAC CE message for group scheduling indicates each PUCCH resource, 0, 1, 2, 3, 4, 5, 6 and 7 need to be indicated, and three bits (log 2 (8)=3 bits) are required; and if the DCI or MAC CE message for group scheduling indicates every other PUCCH resource, for example, only 0, 2, 4, 6 need to be indicated, and only two bits (log 2 (4)=2 bits) are required. The indication rules may be predetermined, or informed through the high-layer signaling.

The method for indicating the start position of the available first implicit feedback resource in the DCI or MAC CE message for group scheduling may be as follows:

A: Indicate a value x, and allocate several PUCCH resources (in a continuous or alternate manner) before or after the PUCCH resource corresponding to the value x to a group of UEs, where a granularity of indication may be per each PUCCH resource or every several PUCCH resources. For example, a value x is indicated through high-layer signaling, and the corresponding PUCCH resources are: $n_{PUCCH}^{(1)} = x + N_{PUCCH}^{(1)}$, where $N_{PUCCH}^{(1)}$ is a high-layer configured parameter.

B: Indicate an offset value relative to the implicit feedback resource for group scheduling, and allocate several PUCCH resources (in a continuous or alternate manner) before or after the offset value to a group of UEs, where a granularity of indication may be per each PUCCH resource or every several PUCCH resources.

In the LTE system, whether to use a PUCCH multi-antenna transmit diversity mechanism may be configured for a UE. In this embodiment, if a UE in a scheduling group is configured to use the PUCCH multi-antenna transmit diversity mechanism, the UE in the scheduling group needs to occupy two feedback resources when adopting the first feedback resource to send feedback information for downlink data. For example, if the DCI or MAC CE message for group scheduling indicates that the start position of the first implicit feedback resource is the PUCCH resource with the serial number being 2, the PUCCH resources may be continuously allocated, i.e., the PUCCH resources with the serial numbers being 2 and 3 are allocated to one UE for use, the PUCCH resources with the serial numbers being 4 and 5 are allocated to another UE for use, and the rest can be deduced by analogy; or the PUCCH resources may be allocated in an interlaced manner, i.e., the PUCCH resources with the serial numbers being 2 and 4 are allocated to one UE for use, the PUCCH resources with the serial numbers being 3 and 5 are allocated to another UE for use, and the rest can be deduced by analogy; while if the UE in the scheduling group is not configured to use the PUCCH multi-antenna transmit diversity mechanism, the UE in the scheduling group only needs to occupy one feedback resource when adopting the first feedback resource to send feedback information for downlink data.

Optionally, in an optional implementation manner of this embodiment, if the second feedback resource includes the reserved feedback resource and the first implicit feedback resource, the first implicit feedback resource is a feedback resource corresponding to a PDCCH resource used by the base station other than a PDCCH resource used for bearing the DCI.

Example 8

During each group scheduling, several user equipments (UE) (for example, the first several UEs according to an ascending order of serial numbers of UEs) adopt several implicit feedback resources (i.e., second implicit feedback resources, namely, PUCCH resources corresponding to a CCE mapped by a PDCCH bearing received DCI) for feedback, and the remaining UE adopts a reserved feedback resource and/or a first implicit feedback resource (i.e., PUCCH resource corresponding to a CCE mapped by a PDCCH other than a PDCCH resource bearing the DCI) for feedback, where start positions of the available reserved feedback resource and the available first implicit feedback resource are indicated in the DCI or a MAC CE message for group scheduling.

The method for indicating the start positions of the available reserved feedback resource and the available first implicit feedback resource in the DCI or MAC CE message for group scheduling may be as follows:

A. Adopt 4 bits for indication.

One bit may be adopted to indicate which feedback resource is used, for example, "0" is used to indicate that the reserved feedback resource is used, and "1" is used to indicate that the first implicit feedback resource is used; or, "1" is used to indicate that the reserved feedback resource is used, and "0" is used to indicate that the first implicit feedback resource is used; and the remaining 3 bits are used to indicate the start position of the second feedback resource.

B. Adopt 2 bits for indication.

"00" is used to indicate that the reserved feedback resource is used and the occupation starts from a certain reserved feedback resource by default, for example, the occupation starts from a PUCCH resource with the serial number being 0;

"01" is used to indicate that the first implicit feedback resource is used and forward search for the PUCCH resource is performed, for example, the PUCCH resource before the PUCCH resource corresponding to the PDCCH resource for group scheduling may be unoccupied, and forward search for the unoccupied PUCCH resource is directly performed;

"10" is used to indicate the start position of the adopted reserved feedback resource, where n reserved feedback resources (a value of n is predetermined or informed through the high-layer signaling) are used first, the occupation starts from a certain reserved feedback resource by default, and then forward search for the PUCCH resource is performed; and "11" is used to indicate the start position of the adopted first implicit feedback resource, where forward search for m PUCCH resources (a value of m is predetermined or informed through the high-layer signaling) are first performed; and then the reserved feedback resource is searched, where the occupation starts from a certain reserved feedback resource by default.

Example 9

During each group scheduling, all the UEs adopt a reserved feedback resource and/or a first implicit feedback resource (i.e., a PUCCH resource corresponding to a CCE mapped by a PDCCH other than a PDCCH resource bearing DCI) for feedback, where start positions of the available reserved feedback resource and the available first implicit feedback resource are indicated in the DCI or a MAC CE message for group scheduling.

The method for indicating the start positions of the available reserved feedback resource and the available first implicit feedback resource in the DCI or MAC CE message for group scheduling may be as follows:

A. Adopt 4 bits for indication.

One bit may be adopted to indicate which feedback resource is used, for example, "0" is used to indicate that the reserved feedback resource is used, and "1" is used to indicate that the first implicit feedback resource is used; or, is used to indicate that the reserved feedback resource is used, and "0" is used to indicate that the first implicit feedback resource is used; and the remaining 3 bits are used to indicate the start position of the second feedback resource.

B. Adopt 2 bits for indication.

"00" is used to indicate that the reserved feedback resource is used and the occupation starts from a certain reserved feedback resource by default, for example, the occupation starts from a PUCCH resource with the serial number being 0;

"01" is used to indicate that the first implicit feedback resource is used and forward search for the PUCCH resource is performed, for example, the PUCCH resource before the PUCCH resource corresponding to the PDCCH resource for group scheduling may be unoccupied, and forward search for the unoccupied PUCCH resource is directly performed;

"10" is used to indicate the start position of the adopted reserved feedback resource, where n reserved feedback resources (a value of n is predetermined or informed through the high-layer signaling) are used first, the occupation starts from a certain reserved feedback resource by default, and then forward search for the PUCCH resource is performed; and "11" is used to indicate the start position of the adopted first implicit feedback resource, where forward search for m PUCCH resources (a value of m is predetermined or informed through the high-layer signaling) are first performed; and then the reserved feedback resource is searched, where the occupation starts from a certain reserved feedback resource by default.

In this embodiment, a base station sends to a terminal, DCI used for downlink data group scheduling and location information of a first feedback resource, where the DCI is used to indicate a scheduling condition of each terminal in a scheduling group to which the terminal belongs; and sends downlink data to the terminal, so that the terminal receives the downlink data according to the DCI, and the base station is capable of receiving feedback information for the downlink data sent by the terminal, where the feedback information for the downlink data is sent by the terminal to the base station according to the scheduling condition by using the feedback resource indicated by the location information of the first feedback resource. The number of terminals scheduled by the base station is no longer restricted by an aggregation level adopted by a PDCCH which is used by the base station to bear the DCI, which solves a problem in the prior art that some terminals cannot send feedback information for downlink data to the base station due to lack of a PUCCH resource when the number of terminals scheduled by the base station exceeds the aggregation level adopted by the PDCCH, thereby improving feedback capabilities of the terminals.

It should be noted that, as for the foregoing method embodiments, for simple description, the methods are described as a series of action combination, but persons skilled in the art should know that, this application is not limited by the described action sequence, because according to this application, some steps may be performed in other orders or performed simultaneously. Next, persons skilled in the art should also know that, the embodiments described in the specification are exemplary embodiments, and the involved actions and modules are not indispensable for this application.

In the foregoing embodiments, descriptions of the embodiments have different emphases, and as for parts that are not described in detail in one embodiment, reference can be made to the relevant description of the other embodiments.

Figure 4:
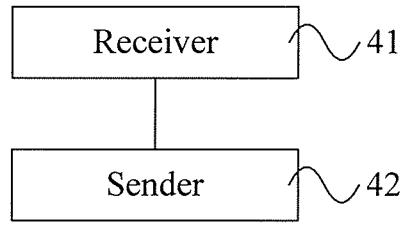
FIG. 4 is a schematic structural diagram of a terminal according to another embodiment of this application.

FIG. 4 is a schematic structural diagram of a terminal according to another embodiment of this application. As shown in FIG. 4, the terminal according to this embodiment may include a receiver 41 and a sender 42. The receiver 41 is configured to receive from a base station, DCI used for downlink data group scheduling and location information of a first feedback resource, where the DCI is used to indicate a scheduling condition of each terminal in a scheduling group to which the terminal belongs, and receive, according to the DCI, downlink data sent by the base station. The sender 42 is configured to send, according to the scheduling condition, feedback information for the downlink data by using the feedback resource indicated by the location information of the first feedback resource.

Optionally, in an optional implementation manner of this embodiment, the location information of the first feedback resource (i.e., an available feedback resource) received by the receiver 41 may be included in the DCI or in high-layer signaling.

For example, the high-layer signaling may be a radio resource control (RRC) message, and specifically, the location information of the first feedback resource may be carried through an information element (IE) in the RRC message. The RRC message may be an RRC message in the prior art, such as an RRC connection reconfiguration message, which is not limited in this embodiment, and an IE of the existing RRC message is extended to carry the location information of the first feedback resource; or the RRC message may also be different from the existing RRC message in the prior art.

In another example, the high-layer signaling may be a media access control (MAC) control element (CE) message, and specifically a new MAC CE message may be added to carry the location information of the first feedback resource.

Optionally, in an optional implementation manner of this embodiment, the first feedback resource (i.e., a PUCCH resource) is a subset of a second feedback resource (i.e., a PUCCH resource), and the second feedback resource may include, but is not limited to, at least one of the following feedback resources:

a reserved feedback resource preconfigured for the scheduling group to which the terminal belongs, where the reserved feedback resource is allowed to overlap a reserved feedback resource of another scheduling group; and a first implicit feedback resource, where the first implicit feedback resource is a feedback resource corresponding to a PDCCH resource used by the base station other than a PDCCH resource used for bearing the DCI.

Because the reserved feedback resources can overlap, i.e., the reserved feedback resources configured for scheduling groups are allowed to overlap, the reserved feedback resources can be effectively saved. The base station can determine, according to an occupation condition of the reserved feedback resources and a current group scheduling condition, which reserved feedback resource is idle, and deliver, to a currently scheduled terminal in the scheduling group, location information of the idle reserved feedback resource as location information of the available reserved feedback resource.

Due to use of the first implicit feedback resource, a utilization rate of the first implicit feedback resource can be effectively improved. The base station can determine, according to the occupation condition of the first implicit feedback resource and the current group scheduling condition, which first implicit feedback resource is idle, and deliver, to the currently scheduled terminal in the scheduling group, location information of the idle first implicit feedback resource as location information of the available first implicit feedback resource.

The location information of the first feedback resource may be an absolute start position of the first feedback resource. Such location information requires a large number of bits, and is only suitable as the location information included in the high-layer signaling but not suitable as the location information included in the DCI, so the overhead is relatively high. Or, the location information of the first feedback resource may be a relative start position of the first feedback resource (i.e., a start position in the second feedback resource). Such location information requires a small number of bits and is suitable as the location information included in the DCI and in the high-layer signaling, so the overhead is relatively low.

Optionally, in an optional implementation manner of this embodiment, if the second feedback resource is the reserved feedback resource, the receiver 41 may further receive the location information of the reserved feedback resource sent by the base station. Correspondingly, the location information of the first feedback resource may be a start position in the second feedback resource.

The reserved feedback resources may be continuous PUCCH resources or alternate PUCCH resources, and this embodiment is not limited thereto.

Optionally, in an optional implementation manner of this embodiment, the sender 42 may specifically determine, according to the scheduling condition and the location information of the first feedback resource, the feedback resource corresponding to the terminal, and send feedback information for the downlink data by using the determined second feedback resource.

Optionally, in an optional implementation manner of this embodiment, the sender 42 may further send feedback information for the downlink data according to the scheduling condition by using a second implicit feedback resource indicated by location information of a pre-obtained second implicit feedback resource, where the pre-obtained second implicit feedback resource is a feedback resource corresponding to the PDCCH resource used by the base station to bear the DCI. Specifically, the sender 42 may specifically determine, according to the scheduling condition and the location information of the pre-obtained second implicit feedback resource, the second implicit feedback resource corresponding to the terminal, and then, the terminal sends the feedback information for the downlink data by using the determined second implicit feedback resource.

In this embodiment, a terminal receives, through a receiver and from a base station, DCI used for downlink data group scheduling and location information of a first feedback resource, where the DCI is used to indicate a scheduling condition of each terminal in a scheduling group to which the terminal belongs, and receives, according to the DCI, downlink data sent by the base station, so that a sender is capable of sending, according to the scheduling condition by using the feedback resource indicated by the location information of the first feedback resource, feedback information for the downlink data. The number of terminals scheduled by the base station is no longer restricted by an aggregation level adopted by a PDCCH which is used by the base station to bear the DCI, which solves a problem in the prior art that some terminals cannot send feedback information for downlink data to the base station due to lack of the PUCCH resource when the number of terminals scheduled by the base station exceeds the aggregation level adopted by the PDCCH, thereby improving feedback capabilities of the terminals.

Figure 5:
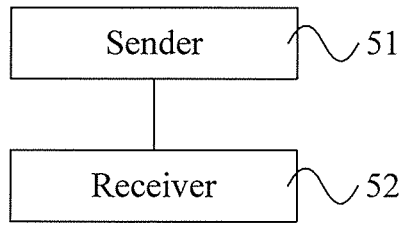
FIG. 5 is a schematic structural diagram of a base station according to another embodiment of this application.

FIG. 5 is a schematic structural diagram of a base station according to another embodiment of this application. As shown in FIG. 5, the base station according to this embodiment may include a sender 51 and a receiver 52. The sender 51 is configured to send to a terminal, DCI used for downlink data group scheduling and location information of a first feedback resource, where the DCI is used to indicate a scheduling condition of each terminal in a scheduling group to which the terminal belongs, and send downlink data to the terminal, so that the terminal receives the downlink data according to the DCI. The receiver 52 is configured to receive feedback information for the downlink data sent by the terminal, where the feedback information for the downlink data is sent by the terminal to the base station according to the scheduling condition by using the feedback resource indicated by the location information of the first feedback resource.

Optionally, in an optional implementation manner of this embodiment, the location information of the first feedback resource (i.e., an available feedback resource) sent by the sender 51 to the terminal may be included in the DCI or in high-layer signaling.

For example, the high-layer signaling may be a radio resource control (RRC) message, and specifically, the location information of the first feedback resource may be carried through an information element (IE) in the RRC message. The RRC message may be an RRC message in the prior art, such as an RRC connection reconfiguration message, which is not limited in this embodiment; and an IE of the existing RRC message is extended to carry the location information of the first feedback resource. Or, the RRC message may also be different from the existing RRC message in the prior art.

In another example, the high-layer signaling may be a media access control (MAC) control element (CE) message, and specifically a new MAC CE message may be added to carry the location information of the first feedback resource.

Optionally, in an optional implementation manner of this embodiment, the first feedback resource (i.e., a PUCCH resource) is a subset of a second feedback resource (i.e., a PUCCH resource), and the second feedback resource may include, but is not limited to, at least one of the following feedback resources:

a reserved feedback resource preconfigured for the scheduling group to which the terminal belongs, where the reserved feedback resource is allowed to overlap a reserved feedback resource of another scheduling group; and a first implicit feedback resource, where the first implicit feedback resource is a feedback resource corresponding to a PDCCH resource used by the base station other than a PDCCH resource used for bearing the DCI.

Because the reserved feedback resources can overlap, i.e., the reserved feedback resources configured for scheduling groups are allowed to overlap, the reserved feedback resources can be effectively saved. The base station can determine, according to an occupation condition of the reserved feedback resources and a current group scheduling condition, which reserved feedback resource is idle, and deliver, to a currently scheduled terminal in the scheduling group, location information of the idle reserved feedback resource as location information of the available reserved feedback resource.

Due to use of the first implicit feedback resource, a utilization rate of the first implicit feedback resource can be effectively improved. The base station can determine, according to the occupation condition of the first implicit feedback resource and the current group scheduling condition, which first implicit feedback resource is idle, and deliver, to the currently scheduled terminal in the scheduling group, location information of the idle first implicit feedback resource as location information of the available first implicit feedback resource.

The location information of the first feedback resource may be an absolute start position of the first feedback resource. Such location information requires a large number of bits, and is only suitable as the location information included in the high-layer signaling but not suitable as the location information included in the DCI, so the overhead is relatively high. Or, the location information of the first feedback resource may be a relative start position of the first feedback resource (i.e., a start position in the second feedback resource). Such location information requires a small number of bits and is suitable as the location information included in the DCI and in the high-layer signaling, so the overhead is relatively low.

Optionally, in an optional implementation manner of this embodiment, if the second feedback resource is the reserved feedback resource, the sender 51 may further send the location information of the reserved feedback resource to the terminal. Correspondingly, the location information of the first feedback resource may be a start position in the second feedback resource.

The reserved feedback resources may be continuous PUCCH resources or alternate PUCCH resources, and this embodiment is not limited thereto.

Optionally, in an optional implementation manner of this embodiment, the terminal may specifically determine, according to a scheduling condition and the location information of the first feedback resource, the feedback resource corresponding to the terminal; and send feedback information for the downlink data by using the determined second feedback resource.

Optionally, in an optional implementation manner of this embodiment, the receiver 52 may further receive the feedback information for the downlink data sent by the terminal, where the feedback information for the downlink data is sent by the terminal to the base station according to the scheduling condition by using a second implicit feedback resource indicated by location information of a pre-obtained second implicit feedback resource, and the pre-obtained second implicit feedback resource is a feedback resource corresponding to the PDCCH resource used by the base station to bear the DCI. Specifically, the terminal may specifically determine, according to the scheduling condition and the location information of the pre-obtained second implicit feedback resource, the second implicit feedback resource corresponding to the terminal; and send the feedback information for the downlink data by using the determined second implicit feedback resource.

In this embodiment, a base station sends, through a sender and to a terminal, DCI used for downlink data group scheduling and location information of a first feedback resource, where the DCI is used to indicate a scheduling condition of each terminal in a scheduling group to which the terminal belongs; and sends downlink data to the terminal, so that the terminal receives the downlink data according to the DCI, and a receiver is capable of receiving feedback information for the downlink data sent by the terminal, where the feedback information for the downlink data is sent by the terminal to the base station according to the scheduling condition by using the feedback resource indicated by the location information of the first feedback resource. The number of terminals scheduled by the base station is no longer restricted by an aggregation level adopted by a PDCCH which is used by the base station to bear the DCI, which solves a problem in the prior art that some terminals cannot send feedback information for downlink data to the base station due to lack of the PUCCH resource when the number of terminals scheduled by the base station exceeds the aggregation level adopted by the PDCCH, thereby improving feedback capabilities of the terminals.

It may be clearly understood by persons skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may also be implemented in a form of hardware plus a software functional module.

The integrated unit implemented in a form of software functional unit may be stored in a computer readable storage medium. The foregoing software functional unit is stored in a storage medium, and includes several instructions for instructing a computer device (which may be a personal computer, a server, or network equipment) or a processor to perform a part of the steps of the methods described in the embodiments of the present invention. The foregoing storage medium includes: any medium that can store program codes, such as a USB flash disk, a removable hard disk, a read-only memory (ROM), a random access memory (RAM), a magnetic disk, or an optical disk.

Finally, it should be noted that the foregoing embodiments are merely intended for describing the technical solutions of the present application other than limiting the present application. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A method for transmitting feedback information for downlink data, the method comprising:
   receiving, by a terminal from a base station, downlink control information (DCI) used for downlink data group scheduling and location information of a first feedback resource, wherein the DCI is used to indicate a scheduling condition of each terminal in a scheduling group to which the terminal belongs;
   receiving, by the terminal according to the DCI, downlink data from the base station; and
   sending, by the terminal according to the scheduling condition, feedback information for the downlink data by using the first feedback resource indicated by the location information of the first feedback resource,
   wherein the first feedback resource is a subset of a second feedback resource, and the second feedback resource comprises a reserved feedback resource preconfigured for the scheduling group.

2. The method according to claim 1, wherein the location information of the first feedback resource is comprised in the DCI or high-layer signaling.

3. The method according to claim 1, wherein:
   the second feedback resource is the reserved feedback resource; and
   before receiving, by a terminal from a base station, DCI used for downlink data group scheduling and location information of a first feedback resource, the method further comprises:
      receiving, by the terminal, location information of the reserved feedback resource from the base station.

4. The method according to claim 1, wherein the terminals in the scheduling group are configured for machine type communications (MTC).

5. The method according to claim 1, wherein the reserved feedback resource preconfigured for the scheduling group overlaps a second reserved feedback resource of a second scheduling group.

6. A method for transmitting feedback information for downlink data, the method comprising:
   sending, by a base station to a terminal, downlink control information (DCI) used for downlink data group scheduling and location information of a first feedback resource, wherein the DCI is used to indicate a scheduling condition of each terminal in a scheduling group to which the terminal belongs;
   sending, by the base station, downlink data to the terminal; and
   receiving, by the base station, feedback information for the downlink data from the terminal by using the first feedback resource indicated by the location information of the first feedback resource,
   wherein the first feedback resource is a subset of a second feedback resource, and the second feedback resource comprises a reserved feedback resource preconfigured for the scheduling group.

7. The method according to claim 6, wherein the location information of the first feedback resource is comprised in the DCI or high-layer signaling.

8. The method according to claim 6, wherein:
   before sending, by a base station to a terminal, DCI used for downlink data group scheduling and location information of a first feedback resource, the method further comprises:
      sending, by the base station to the terminal, location information of the reserved feedback resource.

9. A terminal, comprising:
   a receiver configured to receive from a base station, downlink control information (DCI) used for downlink data group scheduling and location information of a first feedback resource, wherein the DCI is used to indicate a scheduling condition of each terminal in a scheduling group to which the terminal belongs, and receive, according to the DCI, downlink data from the base station; and
   a processor coupled to a sender and configured to control the sender to send, according to the scheduling condition, feedback information for the downlink data by using the first feedback resource indicated by the location information of the first feedback resource,
   wherein the first feedback resource is a subset of a second feedback resource, and the second feedback resource comprises a reserved feedback resource preconfigured for the scheduling group.

10. The terminal according to claim 9, wherein the location information of the first feedback resource is comprised in the DCI or high-layer signaling.

11. The terminal according to claim 9, wherein:
   the receiver is further configured to receive location information of the reserved feedback resource from the base station.

12. The terminal according to claim 9, wherein the location information of the first feedback resource is a start position in the second feedback resource.

13. The terminal according to claim 9, wherein the processor is further configured to:
   control the sender to send the feedback information for the downlink data according to the scheduling condition by using an implicit feedback resource indicated by location information of a pre-obtained implicit feedback resource, wherein the pre-obtained implicit feedback resource corresponds to a physical downlink control channel (PDCCH) resource used for bearing the DCI.

14. A base station, comprising:
   a processor coupled to a sender and configured to control the sender to send to a terminal, downlink control information (DCI) used for downlink data group scheduling and location information of a first feedback resource, wherein the DCI is used to indicate a scheduling condition of each terminal in a scheduling group to which the terminal belongs, and send downlink data to the terminal according to a scheduling condition of the terminal indicated in the DCI; and a receiver, configured to receive feedback information for the downlink data from the terminal by using the first feedback resource indicated by the location information of the first feedback resource, wherein the first feedback resource is a subset of a second feedback resource, and the second feedback resource comprises a reserved feedback resource preconfigured for the scheduling group.

15. The base station according to claim 14, wherein the location information of the first feedback resource is comprised in the DCI or high-layer signaling.

16. The base station according to claim 14, wherein:
the processor is further configured to control the sender to send, to the terminal, location information of the reserved feedback resource.

17. The base station according to claim 14, wherein the location information of the first feedback resource is a start position in the second feedback resource.

18. The base station according to claim 14, wherein the feedback information is received from an implicit feedback resource indicated by location information of a pre-obtained implicit feedback resource, and the pre-obtained implicit feedback resource corresponds to a physical downlink control channel (PDCCH) resource used for bearing the DCI.

* * * * *